(12) United States Patent
Gorodyansky

(10) Patent No.: US 8,850,326 B2
(45) Date of Patent: Sep. 30, 2014

(54) SYSTEM AND METHOD FOR USING WEB BROWSER TO DISPLAY ADVERTISING MATERIALS TO USER

(75) Inventor: David Gorodyansky, Sunnyvale, CA (US)

(73) Assignee: Anchorfree, Inc., Mountain View, CA (US)

( * ) Notice: Subject to any disclaimer, the term of this patent is extended or adjusted under 35 U.S.C. 154(b) by 476 days.

(21) Appl. No.: 12/796,538

(22) Filed: Jun. 8, 2010

(65) Prior Publication Data

US 2011/0302498 A1 Dec. 8, 2011

(51) Int. Cl.
*G06Q 30/02* (2012.01)

(52) U.S. Cl.
CPC ...................................... *G06Q 30/02* (2013.01)
USPC .............. 715/738; 715/855; 705/14; 709/213

(58) Field of Classification Search
CPC ....................... H04L 29/0809; G06F 17/30899
USPC ......................................... 705/14.67; 715/738
See application file for complete search history.

(56) References Cited

U.S. PATENT DOCUMENTS

| | | | | |
|---|---|---|---|---|
| 2004/0059632 A1* | 3/2004 | Kang et al. | ....................... | 705/14 |
| 2005/0132018 A1* | 6/2005 | Milic-Frayling et al. | ..... | 709/213 |
| 2007/0244900 A1* | 10/2007 | Hopkins et al. | .................. | 707/10 |
| 2008/0183573 A1* | 7/2008 | Muschetto | ....................... | 705/14 |
| 2008/0288342 A1* | 11/2008 | Ingleshwar | ....................... | 705/14 |
| 2009/0055270 A1* | 2/2009 | Magdon-Ismail et al. | ...... | 705/14 |
| 2009/0271744 A1* | 10/2009 | Anders, Jr. | ..................... | 715/855 |
| 2010/0121720 A1* | 5/2010 | Gorodyansky | ............. | 705/14.64 |
| 2010/0169171 A1* | 7/2010 | Gorodyansky | ............. | 705/14.27 |
| 2010/0268726 A1* | 10/2010 | Gorodyansky et al. | ........ | 707/765 |

\* cited by examiner

*Primary Examiner* — William Bashore
*Assistant Examiner* — Reza Nabi
(74) *Attorney, Agent, or Firm* — TransPacific Law Group; Pavel Pogodin, Esq.

(57) ABSTRACT

A computer-implemented system including a memory, a storage device and a processing unit, the memory storing a set of instructions, which, when executed by the processing unit cause the processing unit to perform a method for displaying promotional materials to a user using a browser executing on a client computer. The method involves determining websites in a browsing history of the browser; sending a request to one or more internet resources, the requests being related to the determined websites; receiving the promotional materials from the one or more internet resources in response to the request; associating the received promotional materials with the websites in the browsing history of the browser; and displaying websites in the browsing history of the browser together with the associated promotional materials.

15 Claims, 8 Drawing Sheets

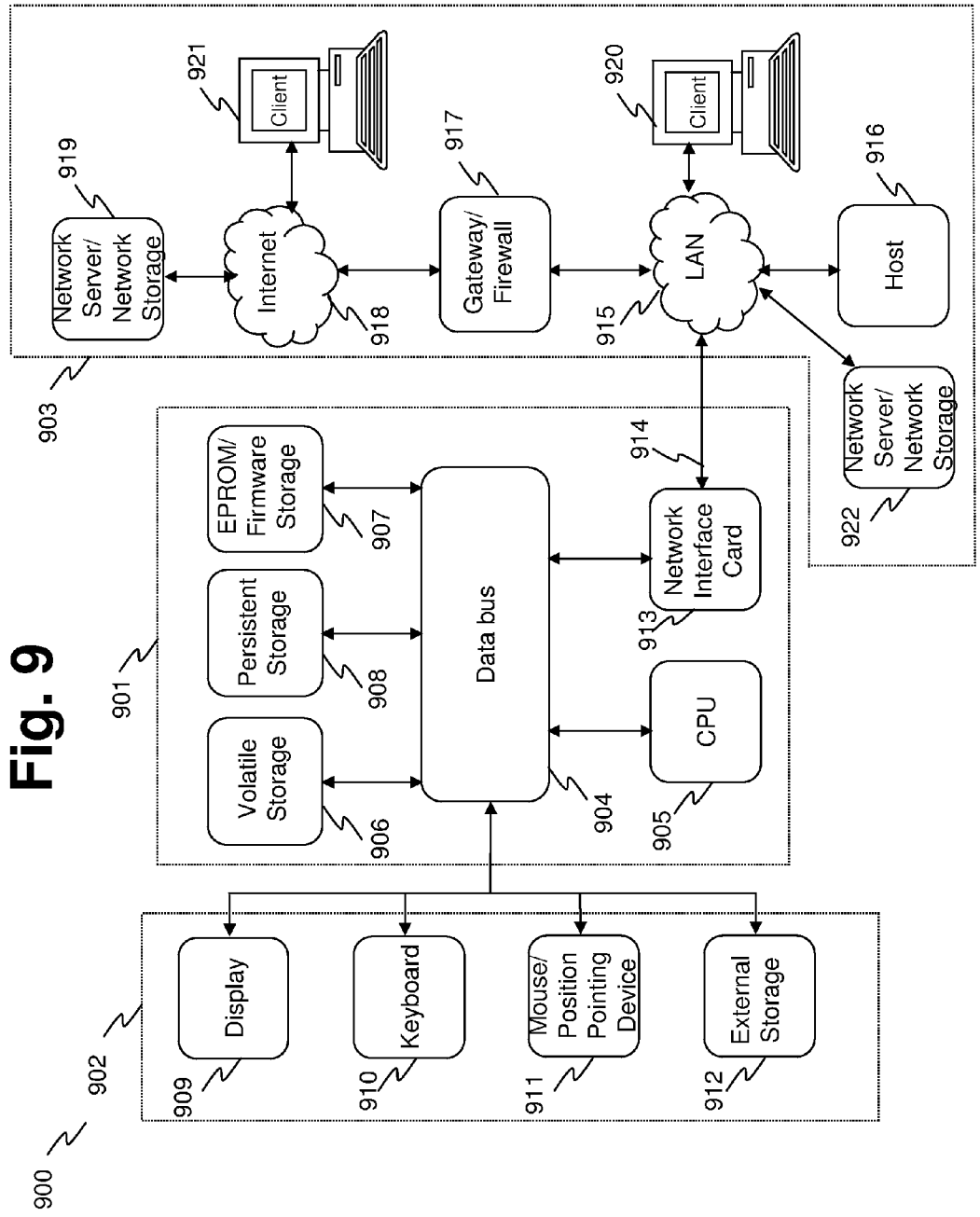

SYSTEM AND METHOD FOR USING WEB BROWSER TO DISPLAY ADVERTISING MATERIALS TO USER

BACKGROUND OF THE INVENTION

1. Field of the Invention

This invention relates in general to methods and systems for enabling internet advertising and, more particularly, to providing novel mechanism for using web browser for display of advertisements to users.

2. Description of the Related Art

Internet advertising is very effective because of the possibility for targeting the advertising materials based on user's demographics as well as intentions/interests/preferences, which can be inferred from the user's online activity history and because more and more people prefer to engage in shopping activity via the Internet. In the recent years there have been devised numerous methods for effectively targeting the advertisements in order to achieve the greatest return on the advertising dollars spent.

On the other hand, the way advertising materials are presented to the Internet user has not changed. Most ads are provided to the user in a form of banner ads, which are usually located on the top of the web page viewed by the user, or as ads that can be placed on web browser toolbar(s). However, it is desirable that the user is also provided with promotional information related to websites that appear, for example, in user's browser history. For instance, if the user was previously looking at buying a pair of shoes at www.shoes.com and decided against making the purchase, seeing that www.shoes.com has store-wise sale and the user can get the same shoes at a substantial discount may change the user's purchasing decision and the user may go forward with the purchase, making revenue for the advertiser.

Therefore, there is a need for systems and methods that provide additional advertising or promotional materials to the user using an internet browser.

SUMMARY OF THE INVENTION

The inventive methodology is directed to methods and systems that substantially obviate one or more of the above and other problems associated with conventional techniques for presenting advertising materials to the user using a web browser.

In accordance with one aspect of the present invention, there is provided a computer-implemented method for displaying promotional materials to a user using a browser executing on a client computer. The inventive method involves: determining websites in a browsing history of the browser; sending a request to one or more internet resources, the requests being related to the determined websites; receiving the promotional materials from the one or more internet resources in response to the request; associating the received promotional materials with the websites in the browsing history of the browser; and displaying websites in the browsing history of the browser together with the associated promotional materials.

In accordance with another aspect of the present invention, there is provided a computer-readable medium incorporating a set of instructions, which, when executed by one or more processors cause the one or more processors to perform a method for displaying promotional materials to a user using a browser executing on a client computer. The inventive method involves: determining websites in a browsing history of the browser; sending a request to one or more internet resources, the requests being related to the determined websites; receiving the promotional materials from the one or more internet resources in response to the request; associating the received promotional materials with the websites in the browsing history of the browser; and displaying websites in the browsing history of the browser together with the associated promotional materials.

In accordance with yet another aspect of the present invention, there is provided a computer-implemented system comprising a memory, a storage device and a processing unit, the memory storing a set of instructions, which, when executed by the processing unit cause the processing unit to perform a method for displaying promotional materials to a user using a browser executing on a client computer. The inventive method involves: determining websites in a browsing history of the browser; sending a request to one or more internet resources, the requests being related to the determined websites; receiving the promotional materials from the one or more internet resources in response to the request; associating the received promotional materials with the websites in the browsing history of the browser; and displaying websites in the browsing history of the browser together with the associated promotional materials.

In accordance with yet another aspect of the present invention, there is provided a computer-implemented method for displaying promotional materials to a user using a browser executing on a client computer. The inventive method involves: determining websites in a bookmark store of the browser; sending a request to one or more internet resources, the requests being related to the determined websites; receiving the promotional materials from the one or more internet resources in response to the request; associating the received promotional materials with the websites in the bookmark store of the browser; and displaying websites in a bookmark display area of the browser together with the associated promotional materials.

Additional aspects related to the invention will be set forth in part in the description which follows, and in part will be obvious from the description, or may be learned by practice of the invention. Aspects of the invention may be realized and attained by means of the elements and combinations of various elements and aspects particularly pointed out in the following detailed description and the appended claims.

It is to be understood that both the foregoing and the following descriptions are exemplary and explanatory only and are not intended to limit the claimed invention or application thereof in any manner whatsoever.

BRIEF DESCRIPTION OF THE DRAWINGS

The accompanying drawings, which are incorporated in and constitute a part of this specification exemplify the embodiments of the present invention and, together with the description, serve to explain and illustrate principles of the inventive technique. Specifically:

FIG. 9 illustrates an exemplary embodiment of a computer platform upon which the inventive system may be implemented.

DETAILED DESCRIPTION

In the following detailed description, reference will be made to the accompanying drawing(s), in which identical functional elements are designated with like numerals. The aforementioned accompanying drawings show by way of illustration, and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense. Additionally, the various embodiments of the invention as described may be implemented in the form of a software running on a general purpose computer, in the form of a specialized hardware, or combination of software and hardware.

Aspects of the present invention provides novel systems and methods for using web browser for displaying advertisements to internet users.

Figure 1:
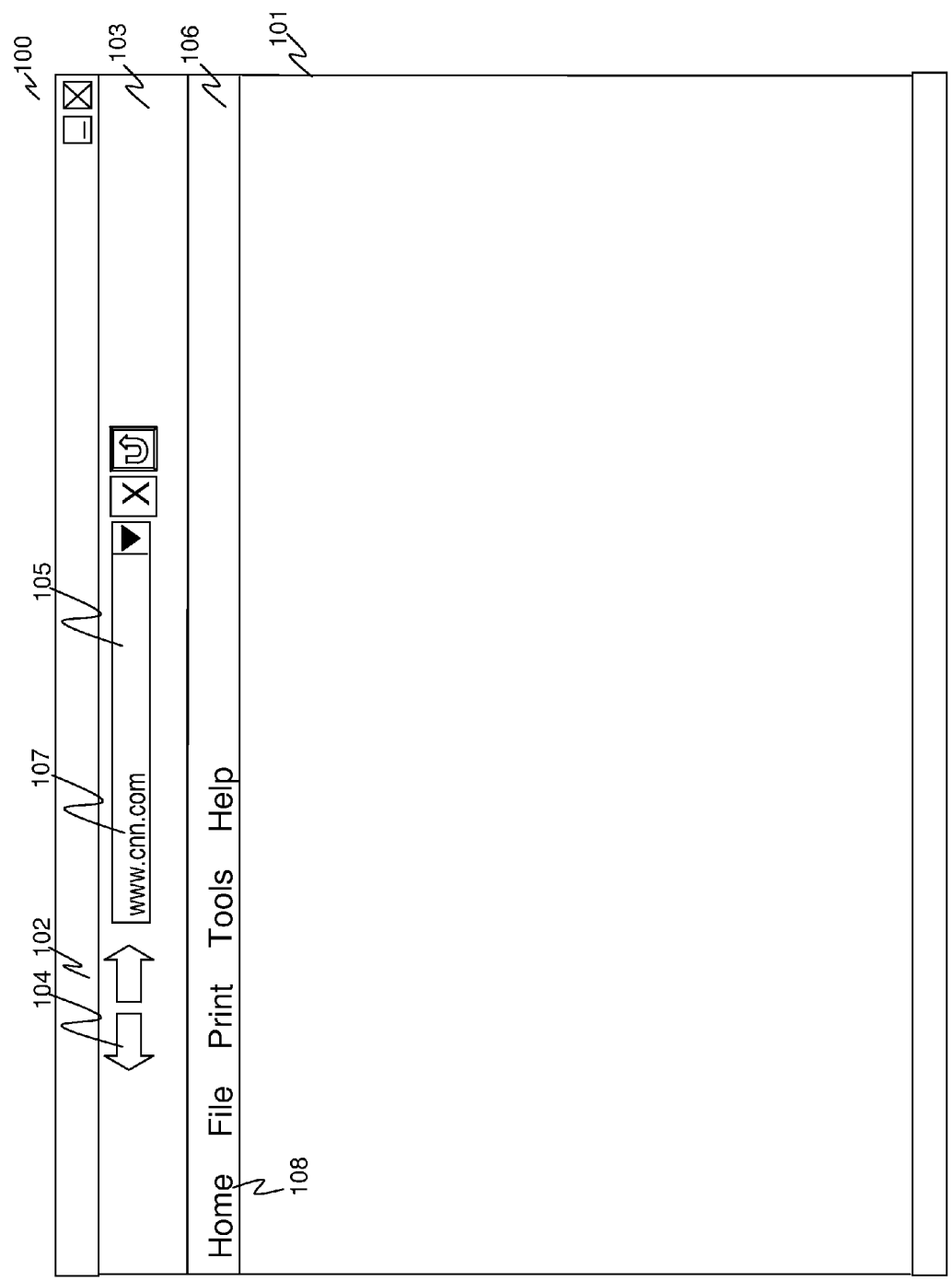
FIG. 1 illustrates a user interface of a conventional internet browser.
Figure 2:
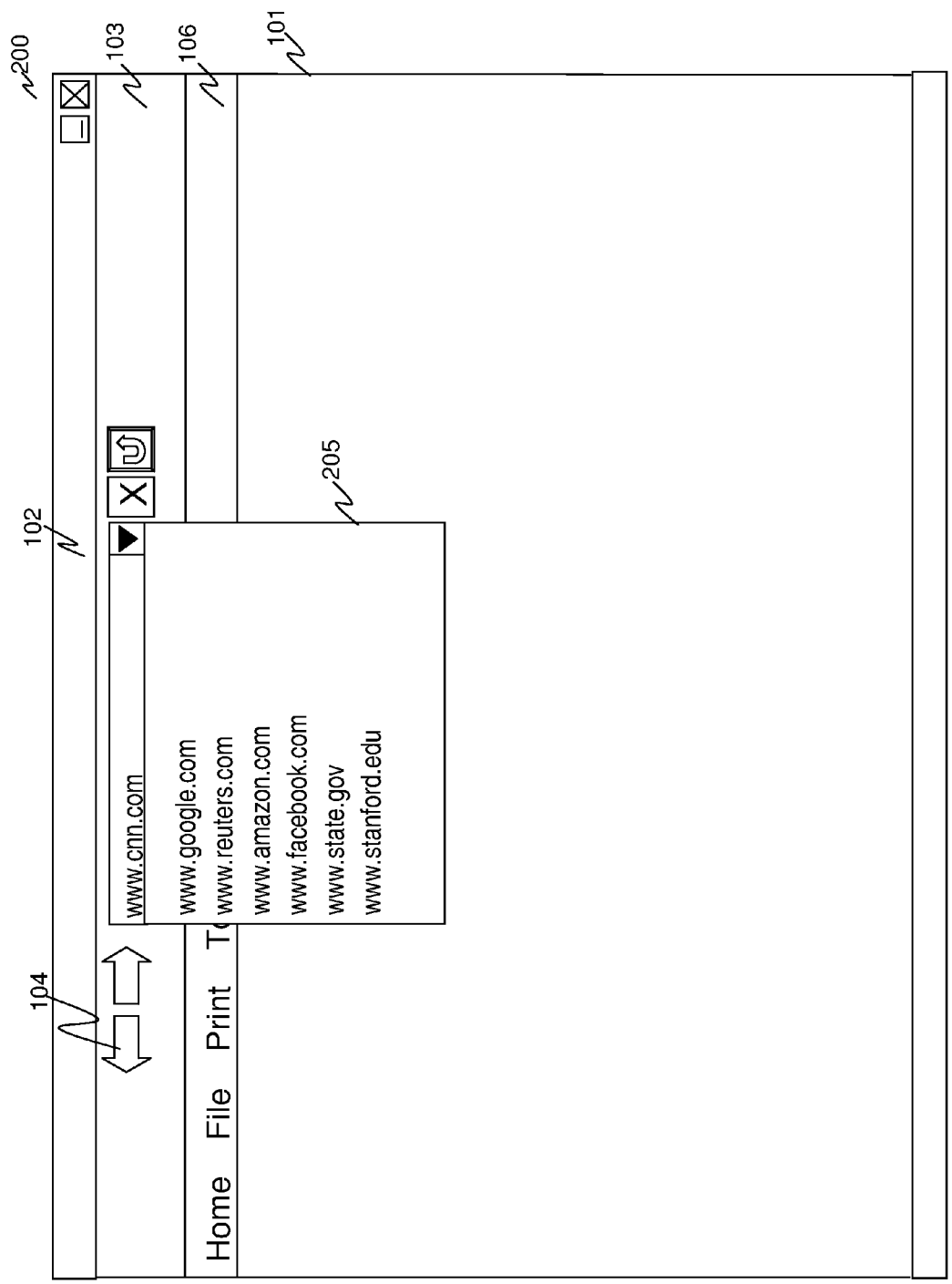
FIG. 2 illustrates another aspect of a user interface of a conventional internet browser.

A user interface 100 of a conventional internet browser is illustrated in FIG. 1. The browser window 101 incorporates a top bar 102 as well as first and second toolbars 103 and 106. The first toolbar 103 includes URL input field 105 for inputting URL 107 into the browser as well as controls 104. The second toolbar 106 includes controls 108. As shown in FIG. 2, illustrating a browser 200, the URL input field 105 comprises a drop-down menu 205, which, when activated, lists all or some of websites that were visited by the user of the browser in the past.

Figure 3:
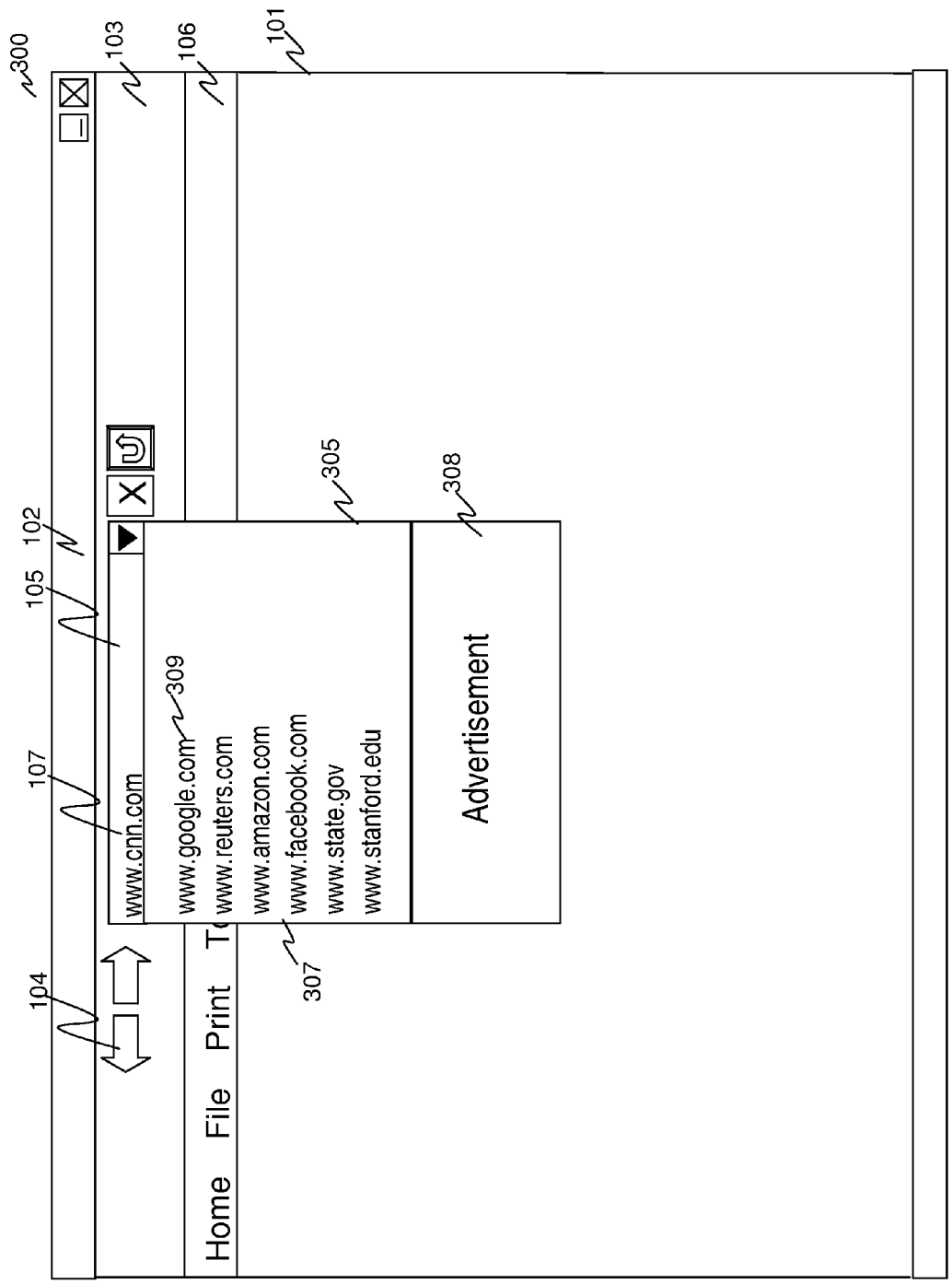
FIG. 3 illustrates an exemplary embodiment of a user interface of an inventive internet browser.

In accordance with an embodiment of a user interface of the inventive browser 300 illustrated in FIG. 3, the drop-down menu 305 associated with the URL input field 105 is subdivided into two areas, including a first area 307 containing a list of all or some of websites that were visited by the user of the browser in the past. In addition, the drop-down menu 305 includes a second area 308, which contains advertising information. The advertising information disposed in area 308 may include one or more advertisings arranged in various ways. In one embodiment of the invention, the advertising area 308 is disposed below the web history area 307. In another embodiment of the invention, the advertising area 308 is disposed above the history area 307. In other embodiments, the advertising area 308 may be positioned to the side of the history area 307.

In one or more embodiments of the invention, the advertisement displayed in the advertising area 308 is related to the content currently displayed on the user's browser. For example, if the user uses the browser to view a car manufactured by Ford Motor Company, the advertisement in the area 308 may be related to a vehicle produced by a competing manufacturer, for example Toyota. To this end, the inventive browser 300 may be equipped with a software module which determines the user's context, determines an advertising related to that context, requests the advertising from a remote server and displays the received advertising to the user in the advertising area 308.

In another embodiment of the invention, the advertising is related to one of more URLs located in the history area 307. In this embodiment, the software module may attempt to guess the invention of the user based on the current content displayed to the user and the URLs listed in the menu 305. For example, if the user currently views the specifications for a Ford vehicle and activates the drop down menu 305, which includes URL cars.com, the software module may make a determination that the user is ready to buy a vehicle on cars.com. Thus, the software module will show the user advertisement for a competing car in the same class and price range as the one viewed by the user. This advertisement will be placed in advertising area 308 when the user activates the drop down menu 305. Thus, the ad displayed in the advertising area 308 may be related to one of the websites in the browser history 307, the website being currently viewed by the user, or selected based on user's demographics as well as intentions/interests/preferences, as determined from the user's online activity history.

Figure 4:
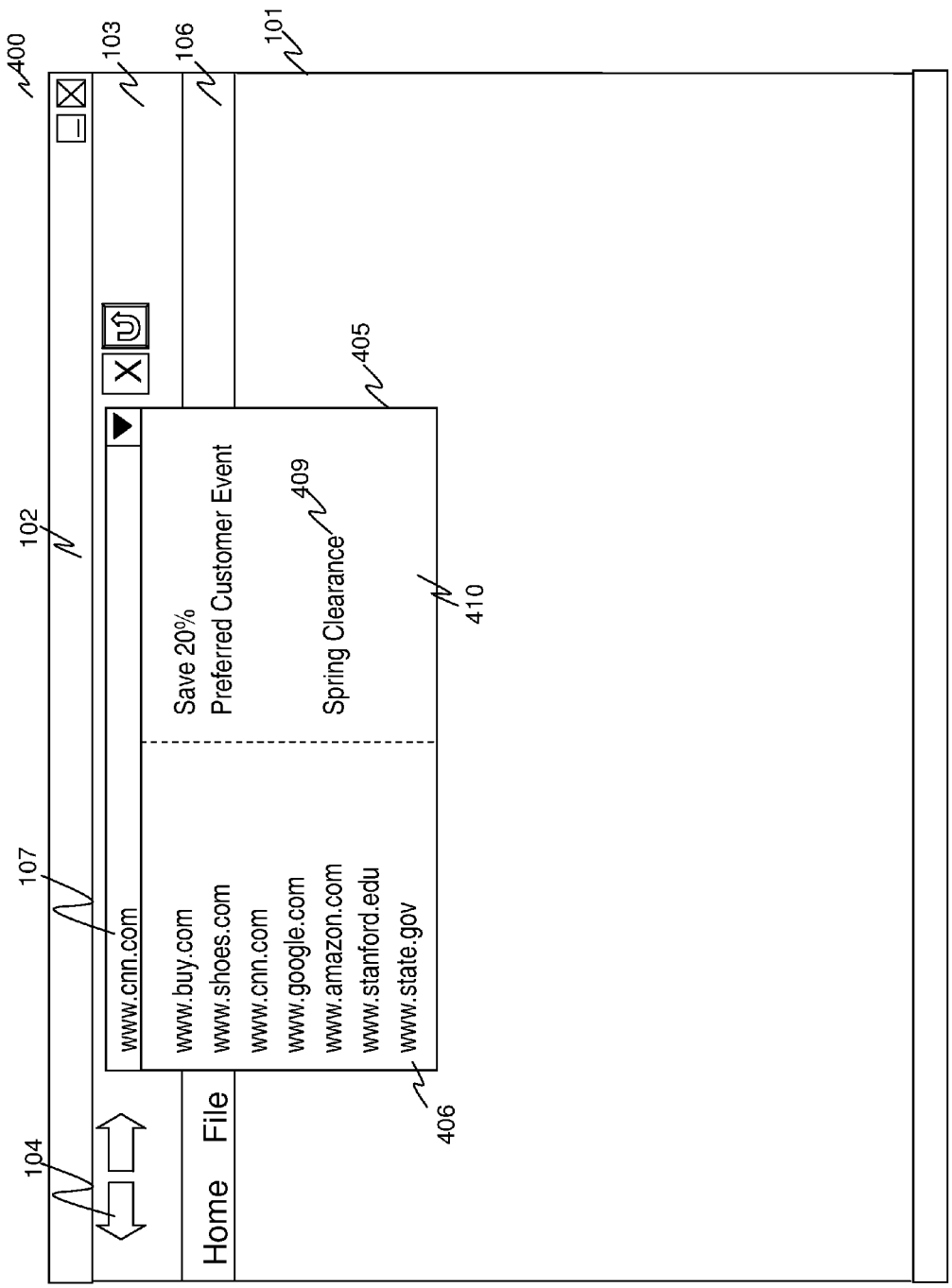
FIG. 4 illustrates another exemplary embodiment of a user interface of an inventive internet browser.

In another embodiment of the invention illustrated in FIG. 4, the advertising area 410 is positioned to the right of the history area 406. In this embodiment, the advertisements 409 are positioned in the advertising area 410 adjacent to the URLs corresponding to those advertisements. For example, if the history area 406 includes URL www.buy.com and it is determined that merchant buy.com advertises 20% coupon, the corresponding advertising may be positioned in the advertising area 410 adjacent to the URL www.buy.com in the history area 406. This way, the user, when looking at the drop-down menu 405 would immediately see the advertisings corresponding to listed URLs.

In this embodiment, to obtain the advertisings 409, the inventive software would periodically check the websites of merchants or other entities corresponding to URLs listed in the history area for available coupons and other promotions. If the promotions are found, the corresponding information will be downloaded and included in the drop-down menu 405. In one or more embodiments, if the user clicks on the advertising displayed in the advertising area 410 of the drop-down menu 405, the user will be taken no the corresponding page on the merchant's website which contains information on the promotion, product or discount.

On the other hand, if the user clicks on the URL in the history area 406 of the menu 405, the user would be taken to the main page of the merchant's website or any other appropriate page. Thus, the embodiment of the inventive system may direct user to different areas of the merchant's website.

Figure 5:
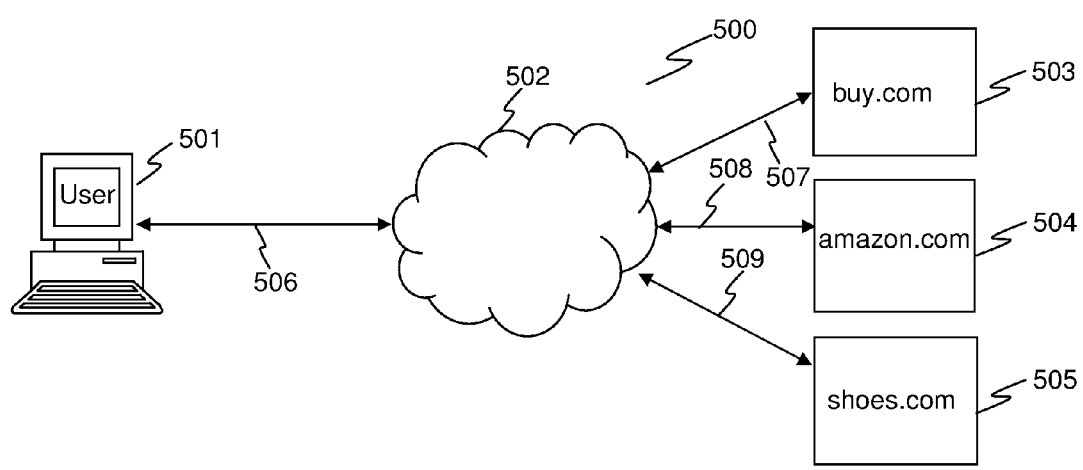
FIG. 5 illustrates an exemplary embodiment of a method for receiving advertisements or other information updates to be displayed to the user using the inventive browser and its drop down menu.

FIG. 5 illustrates an exemplary embodiment of a method 500 for receiving advertisements or other information updates to be displayed to the user using the inventive browser 400 and its drop down menu 405. In this embodiment, the browser application 400 running on the user client computer 501 sends multiple information requests 506-509 for advertisements to the multiple merchant websites 503-505. In response, the merchant websites, or other services, 503-505 provide the browser application with current advertisements relevant to the business activity conducted through the respective websites. In one embodiment of the invention, the aforesaid requests 506-509 may specify the user's context, determined likely preferences of the user, or predicted user intention. Thus, the advertisements received by the user client computer 501 may be targeted in that they may take into account the gender, age, preferences, and the like parameters. For example, if the request indicates that the user's gender is male, the only advertisings of male closing will be furnished to the user's browser. Those targeted advertisements are then shown to the user when the user activates the drop down menu 405. Thus, in the embodiment shown in FIG. 5, the advertisements are provided to the user by individual websites, which appear, for example, in the user's web history file.

Figure 6:
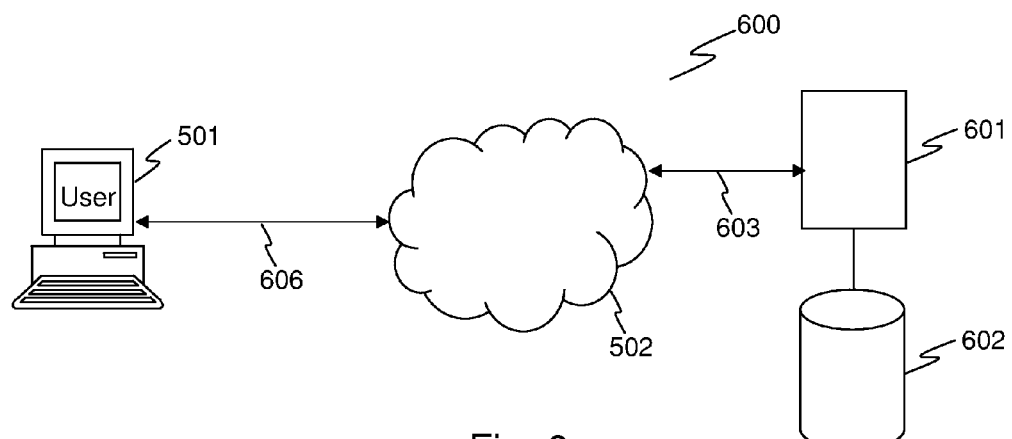
FIG. 6 illustrates an exemplary embodiment, wherein browser executing on the user client computer sends requests through internet to a centralized advertising server, which stores advertising information for multiple online merchants.

In an embodiment illustrated in FIG. 6, the browser executing on the user client computer 501 sends requests 606 and 603 through internet 502 to a centralized advertising server 601, which stores advertising information for multiple online merchants. In this embodiment, the centralized advertising server 601 returns to the user's browser single or multiple advertisements. Those advertisements are stored and retrieved by the server 601 from the advertisement database 602. it should be appreciated by persons of skill in the art that the inventive system is not limited to only one advertising server 601. Multiple such servers may be provided.

Figure 7:
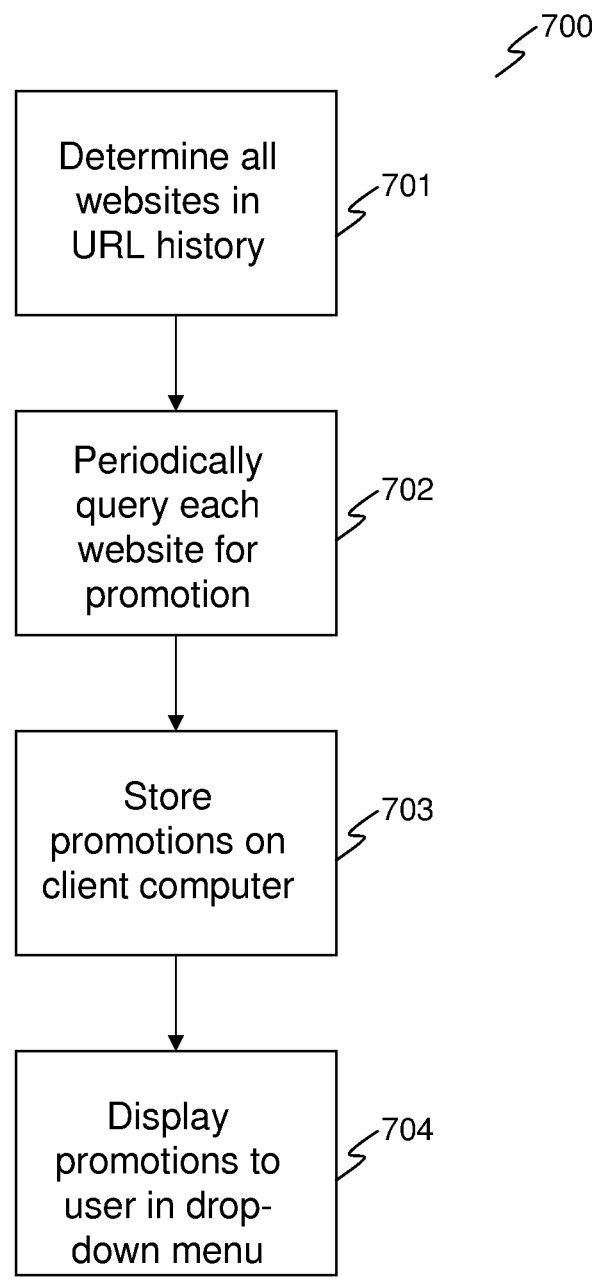
FIG. 7 illustrates an exemplary operating sequence of an embodiment of the inventive system.

FIG. 7 illustrates an exemplary operating sequence of an embodiment of the inventive system. First, at step 701, the inventive software searches for all URLs in the browser's history and determines websites corresponding to said historical URLs. Second, at step 702, the software queries each website for promotional materials. The obtaining of the promotional materials can be done automatically by using website's API or by simply going to a predetermined location within the website and downloading a file or a page containing the target materials.

After the promotional materials have been downloaded, they are stored on the user's computer 501 at step 703 and displayed to the user at step 704.

Figure 8:
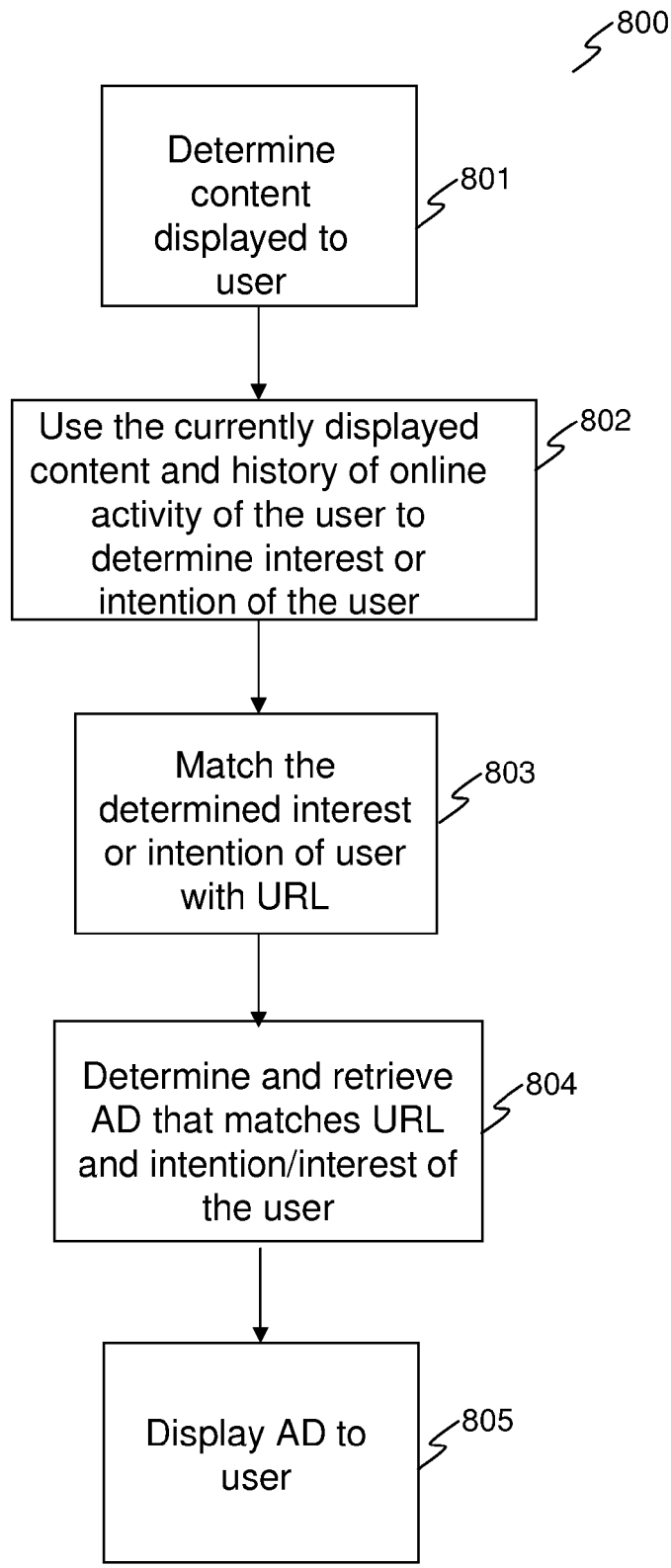
FIG. 8 illustrates another exemplary operating sequence of an embodiment of the inventive system.

FIG. 8 illustrates another exemplary operating sequence of an embodiment of the inventive system. First, at step 801, the software determines the content being currently displayed to the user on the user's browser. After that, the currently displayed content and the history of online activity of the user is used to determine the likely interests and intention of the user, see step 802. For example, if the user is viewing a web page containing specifications of a Ford vehicle and the online history of the user shows that he researcher other cars as well, the system may decide that the user is interested in cars and intends to buy one.

At step 803, the determined interest and intention of the user is matched with the URLs in the history store of the browser. For example, if one of the websites in browser's history is www.cars.com, the system may determine that the user is ready to purchase a vehicle.

At step 804, the system selects an advertisement based on the URLs in the history store of the browser and user's probably intention and interests. In the above example, the system would select an advertisement for a competing vehicle in the same vehicle class as viewed by the user prior to activating the drop down menu 405. The selected advertisements are shown to the user in the drop-down menu 405 next to the corresponding URLs at step 805.

In another embodiment of the invention, the advertisements are added to Bookmark section of the browser in a similar manner to the placing of the advertisements in the history area 307 described hereinabove. The Bookmark section of the browser can be either a drop-down menu activated when the user selects appropriate function from the toolbar of the browser or it can be opened by the user in a separate window, where the users are enabled to store their bookmarks or "favorite" websites. In an embodiment of the invention, the advertisements would appear in the bookmark portion in the same format as the advertisements placed in the history portion of the navigation bar. Specifically, placing advertisements into the bookmarks portion will enable the user to see promotions related to the user's favorite websites, which can result in substantial additional sales and revenue to the advertiser.

In one or more embodiments of the inventive system, there is provided a Browser Advertisement Serving Application. The inventive application is implemented as a browser within a browser that displays video and other content as well as advertising materials. In accordance with an embodiment of the inventive methodology, the content and advertising materials can be contextually displayed in the navigation bar or in the history field or in the bookmark field of the browser. Separate content and advertising materials can be displayed in a separate browser window that appears within a given web page, overlaying any empty space on the web page or moving the web page down or up or to the side. In one or more embodiments of the invention, the inventive browser advertisement serving application can be of different sizes ranging from a small link of text advertisements to a large video.

FIG. 9 illustrates an exemplary embodiment of a computer platform upon which the inventive system may be implemented.

FIG. 9 is a block diagram that illustrates an embodiment of a computer/server system 900 upon which an embodiment of the inventive methodology may be implemented. The system 900 includes a computer/server platform 901, peripheral devices 902 and network resources 903.

The computer platform 901 may include a data bus 905 or other communication mechanism for communicating information across and among various parts of the computer platform 901, and a processor 905 coupled with bus 901 for processing information and performing other computational and control tasks. Computer platform 901 also includes a volatile storage 906, such as a random access memory (RAM) or other dynamic storage device, coupled to bus 905 for storing various information as well as instructions to be executed by processor 905. The volatile storage 906 also may be used for storing temporary variables or other intermediate information during execution of instructions by processor 905. Computer platform 901 may further include a read only memory (ROM or EPROM) 907 or other static storage device coupled to bus 905 for storing static information and instructions for processor 905, such as basic input-output system (BIOS), as well as various system configuration parameters. A persistent storage device 908, such as a magnetic disk, optical disk, or solid-state flash memory device is provided and coupled to bus 901 for storing information and instructions.

Computer platform 901 may be coupled via bus 905 to a display 909, such as a cathode ray tube (CRT), plasma display, or a liquid crystal display (LCD), for displaying information to a system administrator or user of the computer platform 901. An input device 910, including alphanumeric and other keys, is coupled to bus 901 for communicating information and command selections to processor 905. Another type of user input device is cursor control device 911, such as a mouse, a trackball, or cursor direction keys for communicating direction information and command selections to processor 905 and for controlling cursor movement on display 909. This input device typically has two degrees of freedom in two axes, a first axis (e.g., x) and a second axis (e.g., y), that allows the device to specify positions in a plane.

An external storage device 912 may be coupled to the computer platform 901 via bus 905 to provide an extra or removable storage capacity for the computer platform 901. In an embodiment of the computer system 900, the external removable storage device 912 may be used to facilitate exchange of data with other computer systems.

The invention is related to the use of computer system 900 for implementing the techniques described herein. In an embodiment, the inventive system may reside on a machine such as computer platform 901. According to one embodiment of the invention, the techniques described herein are performed by computer system 900 in response to processor 905 executing one or more sequences of one or more instructions contained in the volatile memory 906. Such instructions may be read into volatile memory 906 from another computer-readable medium, such as persistent storage device 908. Execution of the sequences of instructions contained in the volatile memory 906 causes processor 905 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 905 for execution. The computer-readable medium is just one example of a machine-readable medium, which may carry instructions for implementing any of the methods and/or techniques described herein. Such a medium may take many forms, including but not limited to, non-volatile media and volatile media. Non-volatile media includes, for example, optical or magnetic disks, such as storage device 908. Volatile media includes dynamic memory, such as volatile storage 906.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, an EPROM, a FLASH-EPROM, a flash drive, a memory card, any other memory chip or cartridge, or any other medium from which a computer can read.

Various forms of computer readable media may be involved in carrying one or more sequences of one or more instructions to processor 905 for execution. For example, the instructions may initially be carried on a magnetic disk from a remote computer. Alternatively, a remote computer can load the instructions into its dynamic memory and send the instructions over a telephone line using a modem. A modem local to computer system can receive the data on the telephone line and use an infra-red transmitter to convert the data to an infra-red signal. An infra-red detector can receive the data carried in the infra-red signal and appropriate circuitry can place the data on the data bus 905. The bus 905 carries the data to the volatile storage 906, from which processor 905 retrieves and executes the instructions. The instructions received by the volatile memory 906 may optionally be stored on persistent storage device 908 either before or after execution by processor 905. The instructions may also be downloaded into the computer platform 901 via Internet using a variety of network data communication protocols well known in the art.

The computer platform 901 also includes a communication interface, such as network interface card 913 coupled to the data bus 905. Communication interface 913 provides a two-way data communication coupling to a network link 915 that is coupled to a local network 915. For example, communication interface 913 may be an integrated services digital network (ISDN) card or a modem to provide a data communication connection to a corresponding type of telephone line. As another example, communication interface 913 may be a local area network interface card (LAN NIC) to provide a data communication connection to a compatible LAN. Wireless links, such as well-known 802.11a, 802.11b, 802.11g and Bluetooth may also used for network implementation. In any such implementation, communication interface 913 sends and receives electrical, electromagnetic or optical signals that carry digital data streams representing various types of information.

Network link 913 typically provides data communication through one or more networks to other network resources. For example, network link 915 may provide a connection through local network 915 to a host computer 916, or a network storage/server 917. Additionally or alternatively, the network link 913 may connect through gateway/firewall 917 to the wide-area or global network 918, such as an Internet. Thus, the computer platform 901 can access network resources located anywhere on the Internet 918, such as a remote network storage/server 919. On the other hand, the computer platform 901 may also be accessed by clients located anywhere on the local area network 915 and/or the Internet 918. The network clients 920 and 921 may themselves be implemented based on the computer platform similar to the platform 901.

Local network 915 and the Internet 918 both use electrical, electromagnetic or optical signals that carry digital data streams. The signals through the various networks and the signals on network link 915 and through communication interface 913, which carry the digital data to and from computer platform 901, are exemplary forms of carrier waves transporting the information.

Computer platform 901 can send messages and receive data, including program code, through the variety of network(s) including Internet 918 and LAN 915, network link 915 and communication interface 913. In the Internet example, when the system 901 acts as a network server, it might transmit a requested code or data for an application program running on client(s) 920 and/or 921 through Internet 918, gateway/firewall 917, local area network 915 and communication interface 913. Similarly, it may receive code from other network resources.

The received code may be executed by processor 905 as it is received, and/or stored in persistent or volatile storage devices 908 and 906, respectively, or other non-volatile storage for later execution.

It should be noted that the present invention is not limited to any specific firewall system. The inventive policy-based content processing system may be used in any of the three firewall operating modes and specifically NAT, routed and transparent.

Finally, it should be understood that processes and techniques described herein are not inherently related to any particular apparatus and may be implemented by any suitable combination of components. Further, various types of general purpose devices may be used in accordance with the teachings described herein. It may also prove advantageous to construct specialized apparatus to perform the method steps described herein. The present invention has been described in relation to particular examples, which are intended in all respects to be illustrative rather than restrictive. Those skilled in the art will appreciate that many different combinations of hardware, software, and firmware will be suitable for practicing the present invention. For example, the described software may be implemented in a wide variety of programming or scripting languages, such as Assembler, C/C++, perl, shell, PHP, Java, etc.

Moreover, other implementations of the invention will be apparent to those skilled in the art from consideration of the specification and practice of the invention disclosed herein. Various aspects and/or components of the described embodiments may be used singly or in any combination in the system for using web browser for displaying advertisements to users. It is intended that the specification and examples be considered as exemplary only, with a true scope and spirit of the invention being indicated by the following claims.

What is claimed is:

1. A computer-implemented method for displaying promotional materials to a user using a browser executing on a client computer, comprising:
    a. Determining websites in a browsing history of the browser;
    b. Sending a request to one or more internet resources, the request being based on the determined websites in the browsing history of the browser;
    c. Receiving the promotional materials from the one or more internet resources in response to the request, the promotional materials comprising a plurality of advertisements;
    d. Associating the received advertisements with the websites in the browsing history of the browser; and
    e. Displaying websites in the browsing history of the browser together with the associated advertisements, wherein the websites in the browsing history of the browser and the associated advertisements are displayed in a drop down web history menu of the browser address bar, wherein the associated advertisements are displayed in a first area of the drop down web history menu and the websites in the browsing history of the browser are displayed in a second area of the drop down web history menu,
    wherein the associated advertisements are displayed within the drop down web history menu adjacently positioned to a side of the corresponding websites in the browsing history of the browser,
    wherein the websites in the browsing history of the browser that are displayed in the second area include at least domain names of the websites,
    wherein the request specifies demographics of the user determined on the client computer using online history of the user and wherein the promotional materials are based on the demographics of the user.

2. The computer-implemented method of claim 1, wherein the first area is below the second area.

3. The computer-implemented method of claim 1, wherein the one or more internet resources are the determined websites.

4. The computer-implemented method of claim 1, wherein the one or more internet resources is a centralized server providing information on the promotional materials relating to the determined websites.

5. The computer-implemented method of claim 1, wherein the request specifies likely preferences of the user determined on the client computer using online history of the user and wherein the promotional materials are based on the likely preferences of the user.

6. The computer-implemented method of claim 1, wherein the request specifies likely intention of the user determined on the client computer using online history of the user and wherein the promotional materials are based on the likely intention of the user.

7. A non-transitory computer-readable medium comprising a set of instructions, which, when executed by one or more processors cause the one or more processors to perform a method for displaying promotional materials to a user using a browser executing on a client computer, the method comprising:
    a. Determining websites in a browsing history of the browser;
    b. Sending a request to one or more internet resources, the request being based on the determined websites in the browsing history of the browser;
    c. Receiving the promotional materials from the one or more internet resources in response to the request, the promotional materials comprising a plurality of advertisements;
    d. Associating the received advertisements with the websites in the browsing history of the browser; and
    e. Displaying websites in the browsing history of the browser together with the associated advertisements, wherein the websites in the browsing history of the browser and the associated advertisements are displayed in a drop down web history menu of the browser address bar, wherein the associated advertisements are displayed in a first area of the drop down web history menu and the websites in the browsing history of the browser are displayed in a second area of the drop down web history menu,
    wherein the associated advertisements are displayed within the drop down web history menu adjacently positioned to a side of the corresponding websites in the browsing history of the browser,
    wherein the websites in the browsing history of the browser that are displayed in the second area includes at least domain names of the websites,
    wherein the request specifies demographics of the user determined on the client computer using online history of the user and wherein the promotional materials are based on the demographics of the user.

8. The computer-readable medium of claim 7, wherein the first area is below the second area.

9. The computer-readable medium of claim 7, wherein the one or more internet resources are the determined websites.

10. The computer-readable medium of claim 7, wherein the one or more internet resources is a centralized server providing information on the promotional materials relating to the determined websites.

11. The computer-readable medium of claim 7, wherein the request specifies likely preferences of the user determined on the client computer using online history of the user and wherein the promotional materials are based on the likely preferences of the user.

12. The computer-readable medium of claim 7, wherein the request specifies likely intention of the user determined on the client computer using online history of the user and wherein the promotional materials are based on the likely intention of the user.

13. A computerized system comprising a memory, a storage device and a processing unit, the memory storing a set of instructions, which, when executed by the processing unit cause the processing unit to perform a method for displaying promotional materials to a user using a browser executing on a client computer, the method comprising:
    a. Determining websites in a browsing history of the browser;
    b. Sending a request to one or more internet resources, the request being based on the determined websites in the browsing history of the browser;

c. Receiving the promotional materials from the one or more internet resources in response to the request, the promotional materials comprising a plurality of advertisements;

d. Associating the received advertisements with the websites in the browsing history of the browser; and e. Displaying websites in the browsing history of the browser together with the associated advertisements, wherein the websites in the browsing history of the browser and the associated advertisements are displayed in a drop down web history menu of the browser address bar, wherein the associated advertisements are displayed in a first area of the drop down web history menu and the websites in the browsing history of the browser are displayed in a second area of the drop down web history menu, wherein the associated advertisements are displayed within the drop down web history menu adjacently positioned to a side of the corresponding websites in the browsing history of the browser, wherein the websites in the browsing history of the browser that are displayed in the second area includes at least domain names of the websites, wherein the request specifies demographics of the user determined on the client computer using online history of the user and wherein the promotional materials are based on the demographics of the user.

14. A computer-implemented method for displaying promotional materials to a user using a browser executing on a client computer, comprising:

a. Determining websites in a bookmark store of the browser;

b. Sending a request to one or more internet resources, the request being based on the determined websites in the browsing history of the browser;

c. Receiving the promotional materials from the one or more internet resources in response to the request, the promotional materials comprising a plurality of advertisements;

d. Associating the received advertisements with the websites in the bookmark store of the browser; and e. Displaying websites in a bookmark display area of the browser together with the associated advertisements, wherein the websites in the bookmark display of the browser and the associated advertisements are displayed in a drop down menu of the browser, wherein the associated advertisements are displayed in a first area of the drop down menu and the websites in the browsing history of the browser are displayed in a second area of the drop down menu, wherein the associated advertisements are displayed within the drop down menu adjacently positioned to a side of the corresponding websites in the bookmark display of the browser, wherein the websites in the bookmark display of the browser that are displayed in the second area include at least domain names of the websites, wherein the request specifies demographics of the user determined on the client computer using online history of the user and wherein the promotional materials are selected based on the demographics of the user.

15. A computer-implemented method for displaying promotional materials to a user using a browser executing on a client computer, comprising:

a. Determining websites in a browsing history of the browser;

b. Sending a request to one or more internet resources, the request being based on the determined websites in the browsing history of the browser;

c. Receiving the promotional materials from the one or more internet resources in response to the request, the promotional materials comprising a plurality of advertisements;

d. Associating the received advertisements with the websites in the browsing history of the browser; and e. Displaying websites in the browsing history of the browser together with the associated advertisements, wherein the websites in the browsing history of the browser and the associated advertisements are displayed in a drop down web history menu of the browser address bar, wherein the associated advertisements are displayed in a first area of the drop down web history menu and the websites in the browsing history of the browser are displayed in a second area of the drop down web history menu, wherein the associated advertisements are displayed within the drop down web history menu adjacently positioned to a side of the corresponding websites in the browsing history of the browser, wherein the websites in the browsing history of the browser that are displayed in the second area include at least domain names of the websites, wherein the request specifies likely intention of the user determined on the client computer using online history of the user and wherein the promotional materials are selected based on the likely intention of the user.

* * * * *